United States Patent [19]
Thomas

[11] Patent Number: 5,249,597
[45] Date of Patent: Oct. 5, 1993

[54] DIGESTOR TANK HAVING A PRESSURE RELIEF VALVE

[75] Inventor: John Thomas, Brookfield, Wis.

[73] Assignee: Envirex Inc., Waukesha, Wis.

[21] Appl. No.: 958,658

[22] Filed: Oct. 8, 1992

[51] Int. Cl.$^5$ .......................................... F16K 17/194
[52] U.S. Cl. ................. 137/493; 137/533.19; 251/333
[58] Field of Search ............... 137/493, 533.19; 251/333

[56] References Cited

U.S. PATENT DOCUMENTS

| | | |
|---|---|---|
| 54,682 | 5/1866 | Cameron . |
| 216,801 | 5/1879 | Miller . |
| 245,140 | 8/1881 | Cummings . |
| 360,781 | 4/1887 | Nye . |
| 498,121 | 5/1893 | Jones et al. . |
| 1,654,772 | 1/1928 | Akeyson et al. . |
| 2,976,010 | 3/1961 | Huthsing ............................. 251/333 |
| 3,294,116 | 12/1966 | Tremeau . |
| 3,412,563 | 11/1968 | Sharp, Jr. . |
| 3,414,016 | 12/1968 | Sachs ............................. 251/333 X |
| 3,811,470 | 5/1974 | Schaefer ......................... 251/333 X |
| 4,245,667 | 1/1981 | Braukmann ........................ 137/493 |
| 4,570,669 | 2/1986 | Pauliukonis . |
| 4,766,924 | 8/1988 | Lee .................................. 251/333 X |

FOREIGN PATENT DOCUMENTS 628371 8/1978 U.S.S.R. .

Primary Examiner—Robert G. Nilson
Attorney, Agent, or Firm—Michael, Best & Friedrich

[57] ABSTRACT

A pressure relief valve selectively permitting fluid flow through the valve if the pressure on one side of the valve exceeds the pressure on the other side of the valve by a set amount, the pressure relief valve including a first valve member having a valve seat surface, and a movable valve member adapted to releasably engage the first valve member. The movable valve member includes a body portion having a periphery, the periphery having a downwardly extending annular flange engaging the valve seat surface. The downwardly extending annular flange includes a generally spherical valve surface adapted to provide a seal with the valve seat surface by engaging a resilient sealing ring on the valve seat surface. A flexible diaphragm causes movement of the movable valve member away from the valve seat when the pressure on the other side of the valve exceeds the pressure on the one side of the valve by a selected amount. Further, the movable valve member moves away from the valve seat without the action of the diaphragm when the pressure on the one side of the valve exceeds the pressure on the other side of the valve by a selected amount.

21 Claims, 2 Drawing Sheets

DIGESTOR TANK HAVING A PRESSURE RELIEF VALVE

BACKGROUND OF THE INVENTION

The invention relates to a pressure relief valve for use in an anaerobic digestor tank and more particularly to a relief valve for providing fluid flow through the valve if the differential pressure on opposite sides of the valve exceeds a specified amount.

Anaerobic digestor tanks have been used as an effective and economical method of treating and handling biological sludge resulting from treatment of waste water. In such a process, a waste water influent is mixed with a microorganism-containing recycled biomass to form a mixed liquor. The environment of the mixed liquor is appropriately controlled to cause growth of and maintain a satisfactory population of microorganisms which assimilate and anaerobically metabolize the organic waste in the liquor.

A by-product of the anaerobic process includes methane gas It is desirable that the accumulated gas be released under controlled conditions so that it may be used for other purposes. For example, the methane gas may be burned to generate heat, and this heat can be applied to the tanks in order to increase the temperature of the mixed liquor and the rate of anaerobic digestion. To provide for controlled release of methane gas from the digestor, a pressure control valve is provided. Further, a relief valve is provided to relieve the pressure beyond a set limit if the gas production exceeds the rate of use. This relief valve should also permit air flow into the digestor in the event the pressure in the digestor drops below the pressure outside the digestor tank thereby avoiding vacuum which could collapse the tank.

The pressure relief valve used on a digestor tank must be operable at extremes of environmental temperatures including very cold temperatures. Additionally, the gas flowing through the valve may contain substantial amounts of moisture and some solid matter may be entrained in the gas. The solid matter can foul the valve and moisture in the gas can freeze on the valve surfaces in cold weather. Both of these conditions can hamper the operation of relief valves used on digestor tanks.

SUMMARY OF THE INVENTION

The invention provides an improved pressure relief valve for providing fluid flow through the valve if the pressure on one side of the valve varies with respect to the pressure on the other side of the valve by a predetermined pressure. The pressure relief valve of the invention is intended to function even if solid or particulate matter is entrained in gas flowing through the valve and also functions at very low temperatures at which moisture could condense and freeze on the valve. In one preferred embodiment, the relief valve of the invention includes a first valve member having an annular valve seat having an outer upwardly extending valve seat surface. The relief valve further includes a movable valve member adapted to releasably engage the valve seat surface. The movable valve member includes a body portion having a periphery, the periphery including a downwardly extending annular flange having a valve surface. The downwardly extending annular flange includes a generally spherical valve surface adapted to surround and mate with an O-ring supported by the opposed valve seat. The movable valve member is supported such that it is movable away from the valve seat when the pressure on one side of the valve exceeds the pressure on the other side of the valve by a selected amount. Engagement of the generally spherical surface of the movable valve member with the O-ring on the valve seat provides the seal. The valve further includes means for causing movement of the movable valve member away from the valve seat when the pressure on the other side of the valve exceeds the pressure on the first side by selected amounts which may be different from the selected pressure initiating movement of the valve in the first case.

In an alternative embodiment of the invention, the first valve member includes an annular valve seat having an inner downwardly extending inclined valve seat surface. The relief valve of the alternate embodiment further includes a movable valve member with a periphery having a downwardly extending annular flange adapted to engage the inner downwardly extending inclined valve seat surface. The downwardly extending annular flange of the movable valve member includes a generally spherical convex valve surface adapted to mate with the O-ring supported by the opposed valve seat surface.

The construction of the pressure relief valve embodying the invention is an improvement over prior art valves in that it operates effectively within close tolerances at all potential digestor pressures, provides sealing which is independent of the angle at which the movable valve member falls on to the valve seat, functions despite high moisture content in the gas and at low temperatures, and is resistant to valve malfunction due to the presence of particulate matter in the gas.

DETAILED DESCRIPTION OF THE PREFERRED EMBODIMENTS

Figure 1:
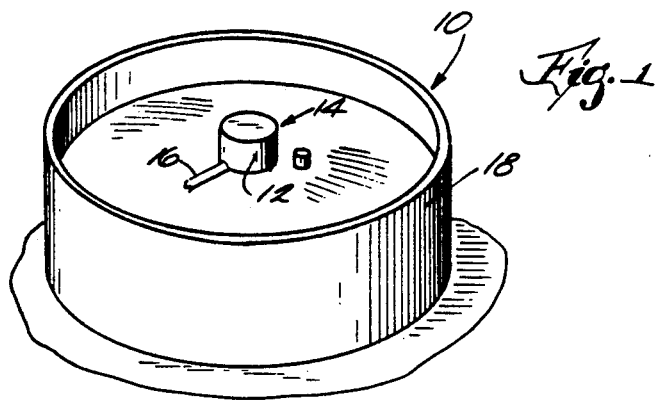
FIG. 1 is a side elevational view of an anaerobic digestor tank having mounted thereon a pressure relief valve embodying the invention.
Figure 2:
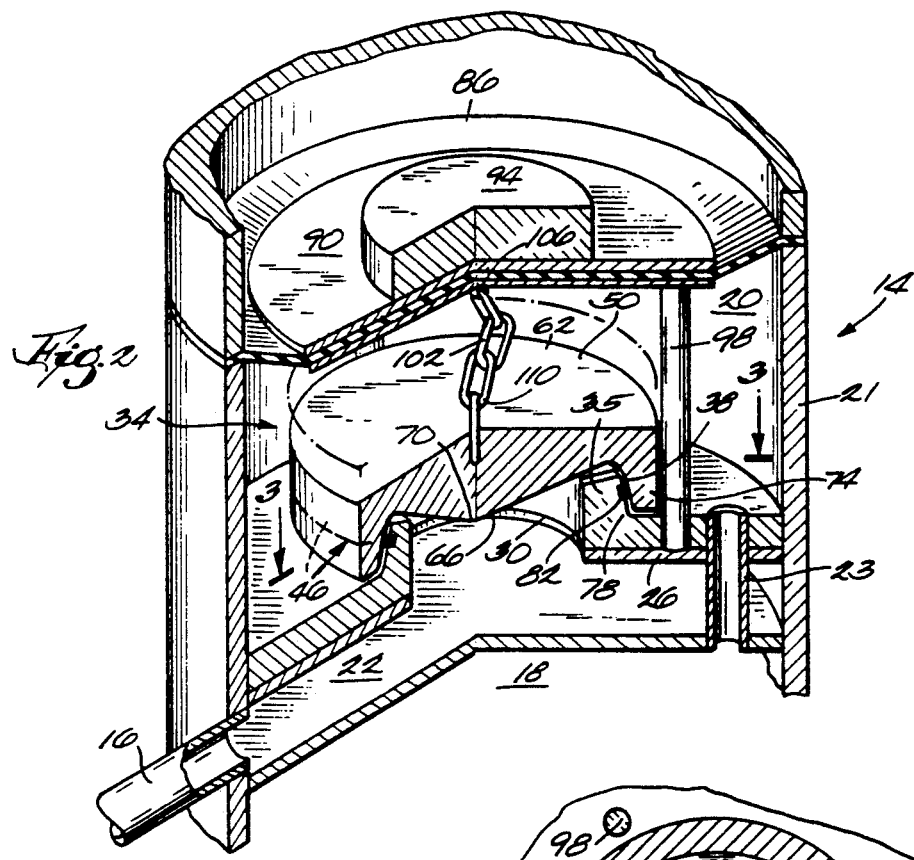
FIG. 2 is an enlarged view of the pressure relief valve shown in FIG. 1 and with portions cut away and shown in section.

FIG. 1 illustrates an anaerobic digestor tank 10 having a pressure relief valve 14 embodying the invention. The pressure relief valve 14 provides for relief of gas from the digestor tank 18 through a pipe or conduit 16 in the event the pressure in the digestor tank 18 exceeds the pressure in the pipe 16 by a predetermined amount. The valve also provides for flow of gas from the pipe 16 into the digestor tank 18 if the gas pressure in pipe 16 exceeds the pressure in the digestor tank by a predetermined amount. More specifically, and as shown in FIG. 2, the pressure relief valve 14 provides fluid flow between two chambers 20 and 22, defined by an outer wall 21, in the event the gas pressure in either chamber exceeds the pressure in the other chamber by a selected amount which may be different for each direction. In the illustrated arrangement chamber 20 communicates with the digestor tank 18 through a pipe 23, and chamber 22 communicates with pipe 16. In practice, the pipe 16 may be open to the atmosphere. A wall 26 separates the chambers 20 and 22. The wall has an opening 30 between the chambers.

Figure 4:
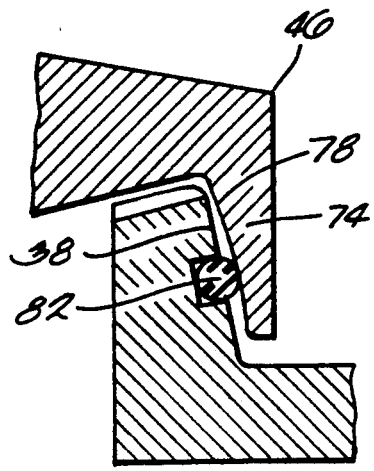
FIG. 4 is an enlarged view of the sealing area.

The pressure vacuum relief valve 14 further includes a valve assembly 34 which selectively allows or prevents fluid flow through the opening 30 between the two chambers 20 and 22. The valve assembly 34 includes an annular ring 35 which surrounds the opening 30 and which projects upwardly from and is fixed to the wall 26. The annular ring 35 includes an outer frustoconical annular valve seat surface 38. As best shown in FIG. 4, the annular valve seat surface 38 includes a groove 83 housing an O-ring 82, the O-ring being supported such that it projects outwardly from the groove 83.

The valve assembly 34 also includes a movable valve member 46 having a surface adapted to releasably engage and mate with the valve seat surface 38. More specifically, the movable valve member 46 includes a body portion 50 generally in the shape of a circular disc having a periphery. The disc-shaped body portion 50 has a top surface 62 and a lower surface 66. In a preferred form of the invention the lower surface is conical and has a center or apex 70 which extends downwardly toward the chamber 22. This construction permits moisture and other residue which may accumulate on the underside of the movable valve member 46 to drain away from the periphery of the lower surface 66 where it could hinder effective sealing. The inclined top surface 62 prevents condensate from accumulating on this surface. Although any suitable materials may be used, making the valve member 46 and annular ring 35 out of plastic reduces the condensate formed on these parts.

The periphery of the movable valve member 46 includes a downwardly extending annular flange 74. The flange 74 includes a curved inner generally spherical valve surface 78 which surrounds and is engageable with the resilient O-ring 82 in mating relation. Since the valve surface 78 is generally spherical, the O-ring 82 makes sealing engagement with the valve surface 78 even if the movable valve member 46 descends and rests unevenly on the O-ring.

While FIGS. 2 and 4 show the O-ring 82 of the preferred embodiment mounted in a groove provided in the valve seat surface 38, the O-ring could alternatively be housed in a groove provided in the valve surface 78 of the valve member 46 in which case surface 38, rather than surface 78, would be made spherical. In either arrangement, in a preferred form of the invention, the valve surface which makes and breaks sealing contact with the O-ring during operation of the valve is generally spherical. The spherical shape of the surface facilitates engagement of the surface with the opposed O-ring even if the valve member 46 is canted with respect to annular ring 35 when it moves into engagement. Additionally, the steep incline of the valve surface allows solid particulates, which may impede effective sealing, to be more easily removed during fluid flow through the valve. As fluid flows through the valve loosening the grip of the particulates residing on the valve surfaces, the force of gravity can more easily "pull" them from the inclined surfaces of the valve. Furthermore, as the differential pressures equalize and the velocity of the fluid flowing through the valve decreases, the particulates tend not to settle on valve surfaces 38 or 78 because they tend to fall from the inclined surfaces. While the embodiments shown in FIGS. 2 and 4 show only the movable valve member having a spherical surface, it is also possible to make both valve member surfaces 38 and 78 spherical. In addition to preventing the build-up of particulate matter on the valve surfaces, the inclined surfaces prevent condensate from accumulating around the sealing area and the resilient sealing ring. Furthermore, the spherical surface 38 of the valve member assures positive sealing by engaging the resilient sealing ring 82 even if the valve member is at an angle as it moves into engagement with the valve seat.

Figure 5:
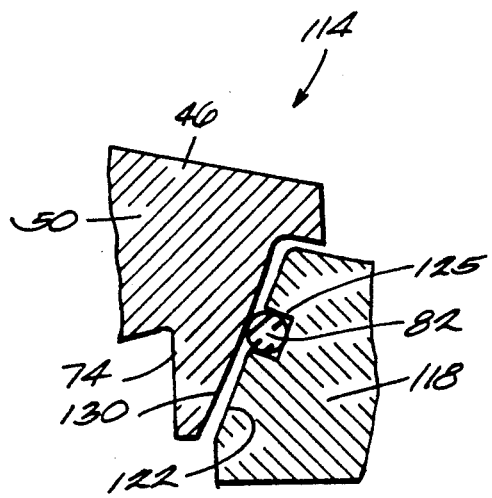
FIG. 5 is an enlarged view of the sealing area of an alternate embodiment of the relief valve.

FIG. 5 is a cut-away view of an alternate embodiment 114 of the relief valve 14. Identical parts will be identified using like reference numerals. The relief valve shown in FIG. 5 includes an annular valve seat 118 surrounding the opening 30 and having an inner downwardly and inwardly inclined valve seat surface 122. The valve seat surface 122 includes a groove 125 housing an annular sealing ring or O-ring 82.

The relief valve 114 shown in FIG. 5 further includes a movable valve member 46 having a curved generally spherical valve surface 130 adapted to releasably engage and mate with the valve seat O-ring 82. The movable valve member 46 includes a body portion 50 generally in the shape of a circular disc having a periphery. The periphery includes a downwardly extending annular flange 74 including the curved generally spherical movable valve surface 130 adapted to engage the O-ring 82 supported by the inner downwardly extending inclined valve seat surface 122.

The embodiment of FIG. 5 could also be constructed with the O-ring 82 mounted on the movable valve surface 130 and with surface 122 formed such that it has a smooth curved generally spherical configuration. In other arrangements, both valve member surfaces can be spherical. In either construction, in a preferred form of the invention, the valve surface which makes and breaks sealing contact with the O-ring during operation of the valve should be curved in a manner which is generally spherical.

In operation of a typical O-ring seal, a certain minimum compression of the O-ring by the mating surface is needed for effective sealing at low pressures. The provision of nearly vertical opposed inclined mating surfaces 78 and 38 provides for substantially greater compressive sealing force between the O-ring and the opposed valve surface than is provided by mating opposed horizontal valve surfaces. Excessive compression of the O-ring at high gas pressures is prevented by the surface 66 of the movable valve member 46 coming into contact with the top surface of the annular ring 35 (FIG. 4) or the bottom surface of the movable valve member 46 at its periphery coming into contact with the valve member 118 (FIG. 5).

Figure 3:
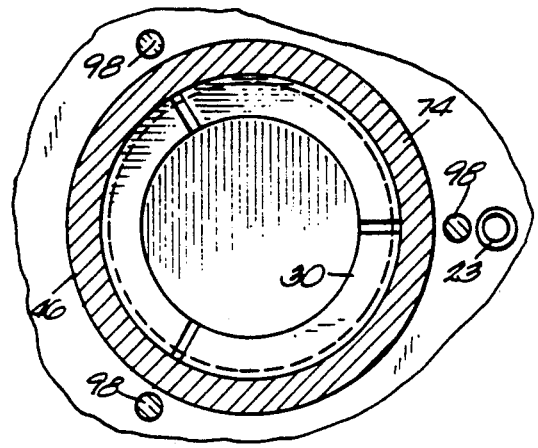
FIG. 3 is a view taken along line 3—3 in FIG. 2.

The relief valve 14 further includes means for causing movement of the valve member 46 away from the valve seat surface 8 when the pressure in the chamber 20 exceeds the pressure in the chamber 22 (which may be atmospheric or otherwise) beyond a set limit. The means for causing movement of the valve member 46 includes a flexible diaphragm or membrane 86 positioned above and spaced from the wall 26, the diaphragm 86 partially defining the chamber 20. The top of diaphragm 86 communicates with the conduit 16. The flexible diaphragm 86 further includes a weight support plate 90 on the upper surface of the membrane and adapted to support a selected weight 94. Means are also provided for limiting the downward movement of the weight support 90 and for guiding the valve member 46 vertically within a range. As shown in FIG. 3, the guiding means provided includes three guide pins 98 fixed to the wall 26 and projecting upwardly from its upper surface. The guide pins 98 are positioned in spaced apart relation around the valve member 46 and permit the valve member 46 to move vertically. When the membrane 86 is in the position shown in FIG. 2, the membrane and the support plate rests on the upper ends of the pins 98.

The means for causing movement of the valve member 46 further includes means for connecting the diaphragm 86 to the valve member 46 such that upward movement of the diaphragm will lift the valve member 46 away from the valve seat. In the specific arrangement shown in the drawings, the connecting means is a flexible member such as a single chain 102 having opposite first and second ends, 106 and 110, respectively. The end 106 of the chain 102 is fixedly attached to the flexible diaphragm 86, while the other end 110 is fixedly attached to the valve member 46.

In operation, the flexible diaphragm 86 moves away from the valve surface 38 as the pressure in the chamber 20 increases. At a specified pressure determined by the weight 94 and the weight of the support assembly, the diaphragm 86 rises to a position where the chain 102 connecting the diaphragm 86 and the valve member 46 becomes taut. Any further pressure increase in the chamber 20 causes the diaphragm 86 and chain 102 to lift the valve member 46 away from the valve seat surface 38 and disengages its sealing contact with the O-ring. The pressure at which this occurs depends upon the mass of the weight 94, and the weight support assembly which includes the chain 102 and the valve member 46. The pressure at which the valve 14 opens may be selected by appropriately selecting the weight 94 supported by the diaphragm 86. As the valve member 46 is lifted off of the valve seat surface 38, thereby opening the valve 14, gas flows from the chamber 20 to chamber 22, relieving the pressure in chambers 20 and 18. As the pressures equalize, the weight of the valve member 46 causes it to return to a closed position.

Alternatively, if the pressure in the chamber 22 exceeds that of chamber 20 by a specified amount determined by the weight of the valve member 46, the valve member 46 will be forced upwardly away from valve seat surface 38, allowing flow of air from chamber 22 to chamber 20 and chamber 18, and a resulting increase in the pressure in chamber 20 and 18, as well as an equalization of the pressures between the chambers. In this situation, the movement of the valve member 46 is not controlled by the movement of the diaphragm 86, and the diaphragm remains stationery.

Once again, as the pressures equalize, the valve member 46 returns to the valve seat 38, thereby closing the valve 14. In the second instance, however, it is the weight of the valve member 46 alone which causes the valve member 46 to seat itself. Thus, the differential pressure at which the valve 14 closes in the second instance may differ from that at which the valve closes in the first instance.

In either case, the valve member 46 is guided in the vertical direction within a limit in order that it will fall generally over the resilient sealing ring 82.

Various features of the invention are set forth in the following claims.

I claim:

1. A pressure relief valve for providing fluid flow through the valve if the pressure on one side of the valve exceeds the pressure on the other side of the valve by a specified amount, the pressure relief valve comprising:
   a first valve member including an annular valve seat having an upwardly extending inclined valve seat surface;
   a cantable movable valve member including a body portion having a periphery including a downwardly extending inclined valve surface adapted to engage the upwardly extending inclined valve seat surface in sealing relation, one of the upwardly inclined valve surface and the downwardly extending inclined valve surface being a curved generally spherical surface so that the valve surfaces seal against one another in the event the movable valve member is canted relative to the first valve member, and the movable valve member being movable away from the upwardly extending inclined valve seat surface when the pressure on one side of the valve exceeds the pressure on the other side of the valve by selected a selected amount; and
   means for causing movement of the movable valve member away from the valve seat when the pressure on the other side of the valve exceeds the pressure on the one side of the valve by a selected amount.

2. A pressure relief valve as set forth in claim 1 wherein said annular valve seat includes an upwardly extending annular flange surrounding a valve bore, the upwardly extending annular flange including said upwardly extending inclined valve seat surface and wherein the body portion of the movable valve member includes an annular peripheral flange extending downwardly, the annular peripheral flange including the downwardly extending inclined valve surface.

3. The pressure relief valve as set forth in claim 2 wherein said annular valve seat includes an outer upwardly extending inclined valve seat surface and wherein said movable valve member periphery includes a downwardly extending annular flange surrounding said outer upwardly extending inclined valve seat surface.

4. A pressure relief valve as set forth in claim 3 wherein the means for causing movement of the movable valve member includes a flexible diaphragm positioned above the movable valve member and movable away from the first valve member when the pressure on the other side of said valve increases, and connecting means for connecting the flexible diaphragm to the movable valve member to cause movement of the movable valve member away from the first valve member when the gas pressure on the other side of said valve causes movement of the flexible diaphragm away from the first valve member.

5. A pressure relief valve as set forth in claim 4 wherein the means for connecting comprises a chain having opposite ends, one of the opposite ends being fixedly attached to the flexible diaphragm, the other of the opposite ends being fixedly attached t the movable valve member.

6. A pressure relief valve as set forth in claim 5 wherein the body of the movable valve member includes a disc having a lower surface and an upper surface and wherein when the valve is closed, the lower surface faces said one of said valve sides and the upper surface faces the other of said valve sides.

7. A pressure relief valve as set forth in claim 6 wherein the lower surface of said disc is conical and has a center projecting downwardly in the direction of said one of said valve sides.

8. A pressure relief valve as set forth in claim 1 and further including means for providing sealing engagement between the upwardly extending inclined valve seat surface and the movable valve member, said means for providing sealing engagement including an annular sealing ring fixedly attached to one of said upwardly extending inclined valve seat surface and said movable valve surface for sealing and opposing engagement with said other opposing valve surface.

9. The pressure relief valve as set forth in claim 8 wherein said valve surface opposing said annular sealing ring has a generally spherical surface for contact with said sealing ring.

10. A pressure vacuum relief valve as set forth in claim 1 and further including means for guiding said movable valve member for vertical movement, said means for guiding including a plurality of vertical guide pins surrounding the movable valve member in spaced apart relation.

11. A digestor apparatus for treating biological sludge comprising:
 a digestor tank defining a first chamber;
 a conduit communicating with said first chamber and defining a second chamber; and
 a pressure relief valve for providing fluid through the valve if the pressure on one side of the valve exceeds the pressure on the other side of the valve by a specified amount, said pressure relief valve including a first valve member including an annular valve seat having an inclined valve seat surface, a cantable movable valve member including a body portion having a periphery including a downwardly extending inclined valve surface adapted to engage the inclined valve seat surface so that the valve surfaces seal against one another in the event the movable valve member is canted relative to the first valve member, one of the inclined valve seat surface and the downwardly extending inclined surface being a curved generally spherical surface, and the movable valve member being movable away from the inclined valve seat surface when the pressure in one of the chambers exceeds the pressure in the other chamber by a selected amount, and means for causing movement of the movable valve member away from the valve seat when the pressure in the other of the chambers exceeds the pressure in the one of the chambers by a selected amount.

12. A digestor apparatus as set forth in claim 11 wherein said pressure relief valve annular valve seat includes an upwardly extending annular flange surrounding a valve bore, the upwardly extending annular flange including said inclined valve seat surface and wherein the body portion of the movable valve member includes an annular peripheral flange extending downwardly, the annular flange including the downwardly extending inclined valve surface.

13. A digestor apparatus as set forth in claim 12 wherein the means for causing movement of the movable valve member includes a flexible diaphragm positioned above the movable valve member and movable away from the first valve member when the pressure on the other side of said valve increases, and connecting means for connecting the flexible diaphragm to the movable valve member to cause movement of the movable valve member away from the first valve member when the gas pressure on the other side of said valve causes movement of the flexible diaphragm away from the first valve member.

14. A digestor apparatus as set forth in claim 13 wherein the means for connecting the flexible diaphragm to the movable valve member comprising a chain having opposite ends, one of the other opposite ends being fixably attached to the flexible diaphragm, the other of the opposite ends being fixably attached to the movable valve member.

15. A digestor apparatus as set forth in claim 14 wherein the body portion of the movable valve member comprises a disk having a lower surface and an upper surface and wherein when the valve is closed, the lower surface faces said one of said digestor chambers and the upper surface faces the other of said digestor chambers.

16. A digestor apparatus as set forth in claim 15 wherein the lower surface of said disk is conical and has a center projecting downwardly toward said one of said digestor chambers.

17. A digestor apparatus as set forth in claim 11 wherein the annular valve seat further comprises an inner downwardly extending inclined valve seat surface and further including means for providing sealing engagement between said inner downwardly extending inclined valve seat surface and the movable valve member, said means for providing sealing engagement including an annular sealing ring fixably attached to one of said inner downwardly extending inclined valve seat surface and said movable valve surface for sealing in opposing engagement with said other valve surface.

18. A digestor apparatus as set forth in claim 17 wherein said valve surface opposing said annular sealing ring has a spherical zone surface for contact with said sealing ring.

19. A digestor apparatus as set forth in claim 11 and further including means for guiding said movable valve member for vertical movement, said means for guiding including a plurality of vertical guide pins surrounding the movable valve member in spaced apart relation.

20. A pressure relief valve for providing fluid flow through the valve if the pressure on one side of the valve exceeds the pressure on the other side of the valve by a specified amount, the pressure relief valve comprising:
 a first valve member including an annular valve seat having an upwardly extending annular flange surrounding a valve bore, the upwardly extending annular flange including an outer upwardly extending inclined valve seat surface;
 a movable valve member including a body portion having a periphery including an annular peripheral flange extending downwardly and surrounding the outer upwardly extending inclined valve seat surface, the annular peripheral flange including a downwardly extending inclined valve surface adapted to engage the upwardly extending inclined valve seat surface in sealing relation, one of the upwardly inclined valve seat surface and the downwardly extending inclined valve surface being a curved generally spherical surface, and the movable valve member being movable away from the upwardly extending inclined valve seat surface when the pressure on one side of the valve exceeds the pressure on the other side of the valve by a selected amount; and
 means for causing movement of the movable valve member away from the valve seat when the pressure on the other side of the valve exceeds the pressure on the one side of the valve by a selected amount.

21. A digestor apparatus for treating biological sludge comprising:
   a digestor tank defining a first chamber;
   a conduit communicating with said first chamber and defining a second chamber; and
   a pressure relief valve for providing fluid flow through the valve if the pressure on one side of the valve exceeds thr pressure on the other side of the valve by a specified amount, said pressure relief valve including a first valve member having an annular valve seat including an upwardly extending annular flange surrounding a valve bore, the upwardly extending annular flange including an outer upwardly extending inclined valve seat surface, a movable valve member including a body portion having a periphery including an annular peripheral flange extending downwardly and surrounding the outer upwardly extending inclined valve seat surface, the annular peripheral flange having a downwardly extending inclined valve surface adapted to engage the upwardly extending inclined valve surface in sealing relation, one of the inclined valve seat surface and the downwardly extending inclined valve surface being a curved generally spherical surface, and the movable valve member being movable away from the inclined valve seat surface when the pressure in one of the chambers exceeds the pressure in the other chamber by a selected amount, and means for causing movement of the movable valve member away from the valve set when the pressure in the other of the chambers exceeds the pressure in the one of the chambers by a selected amount.

* * * * *

UNITED STATES PATENT AND TRADEMARK OFFICE
CERTIFICATE OF CORRECTION

PATENT NO. : 5,249,597
DATED : October 5, 1993
INVENTOR(S) : John Thomas

It is certified that error appears in the above-indentified patent and that said Letters Patent is hereby corrected as shown below:

In Column 4, line 55, delete "8" and insert --38--.

In Column 6, line 58, delete "t" and insert --to--.

In Column 9, line 11, delete "thr" and insert --the--.

Signed and Sealed this

Nineteenth Day of April, 1994

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,249,597
DATED : October 5, 1993
INVENTOR(S) : John Thomas

It is certified that error appears in the above-identified patent and that said Letters Patent is hereby corrected as shown below:

In Column 6, line 20, after "by", delete "selected".

In Column 7, line 27, after "fluid", insert --flow--.

Signed and Sealed this

Eleventh Day of October, 1994

Attest:

BRUCE LEHMAN

Attesting Officer

Commissioner of Patents and Trademarks